United States Patent
Wood et al.

(10) Patent No.: US 7,370,802 B2
(45) Date of Patent: May 13, 2008

(54) HAND HELD SCANNER WITH ROTATING HEAD

(75) Inventors: Todd A. Wood, Grand Prairie, TX (US); Michael J. Cykana, Arlington, TX (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 330 days.

(21) Appl. No.: 11/051,973

(22) Filed: Feb. 4, 2005

(65) Prior Publication Data

US 2005/0189422 A1 Sep. 1, 2005

Related U.S. Application Data

(60) Provisional application No. 60/542,613, filed on Feb. 7, 2004.

(51) Int. Cl.
*G06K 7/10* (2006.01)
*G06K 9/22* (2006.01)

(52) U.S. Cl. .................... 235/462.45; 235/462.43; 235/472.01

(58) Field of Classification Search .......... 235/462.45, 235/462.46, 462.47, 462.43, 472.01, 472.02, 235/462.49, 472.03
See application file for complete search history.

(56) References Cited

U.S. PATENT DOCUMENTS

| | | | | |
|---|---|---|---|---|
| 4,766,297 A | * | 8/1988 | McMillan | 235/462.45 |
| 4,939,356 A | * | 7/1990 | Rando et al. | 235/462.2 |
| 4,983,818 A | * | 1/1991 | Knowles | 235/462.47 |
| 5,140,141 A | * | 8/1992 | Inagaki et al. | 235/462.43 |
| 5,151,581 A | * | 9/1992 | Krichever et al. | 235/462.43 |
| 5,198,650 A | * | 3/1993 | Wike, Jr. | 235/462.45 |
| 5,349,497 A | * | 9/1994 | Hanson et al. | 235/462.47 |
| 5,406,063 A | * | 4/1995 | Jelen | 235/462.46 |
| 5,477,044 A | | 12/1995 | Aragon | 235/472 |
| 5,539,193 A | | 7/1996 | Gibbs et al. | 235/472 |
| 5,539,194 A | | 7/1996 | Miller et al. | 235/472 |
| 5,565,671 A | | 10/1996 | Kirkeby et al. | 235/472 |
| 5,677,522 A | * | 10/1997 | Rice et al. | 235/462.45 |
| 5,763,865 A | * | 6/1998 | Swift et al. | 235/462.45 |
| 5,796,088 A | * | 8/1998 | Wall | 235/472.01 |
| 5,925,872 A | * | 7/1999 | Wyatt et al. | 235/472.01 |
| 5,992,747 A | * | 11/1999 | Katoh et al. | 235/462.43 |
| 6,097,507 A | | 8/2000 | Bohn | 358/473 |
| 6,216,951 B1 | * | 4/2001 | Swift et al. | 235/462.45 |
| 6,234,394 B1 | * | 5/2001 | Kahn et al. | 235/462.46 |
| 6,340,115 B1 | * | 1/2002 | Swartz | 235/462.45 |
| 6,410,931 B1 | * | 6/2002 | Dvorkis et al. | 235/472.01 |

(Continued)

OTHER PUBLICATIONS

"Intelligent Mobile Imager for Postal Applications," IBM e-business and integrated logistics, GISEE181, Mar. 2003, 2 pages.

*Primary Examiner*—Jared J. Fureman

(57) ABSTRACT

A hand-held optical character scanner includes a handle with a base including a plurality of angled planes for supporting the handle on a substantially flat object at different angles relative to the surface of the object, an arm extending from the handle, with a moveable imaging head having a fixed axis lens and a focus range mounted on the arm, the image head being rotatable to selected positions corresponding to the angled planes whereby the distance between the surface of the object and the image head along the lens axis is within the focus range of the lens when the handle is supported on each of the angled planes.

17 Claims, 4 Drawing Sheets

U.S. PATENT DOCUMENTS

| | | |
|---|---|---|
| 6,415,982 B2 * | 7/2002 | Bridgelall et al. ..... 235/472.01 |
| 6,561,429 B2 * | 5/2003 | Bryant et al. .......... 235/462.43 |
| 6,637,660 B2 * | 10/2003 | Yomogida et al. ..... 235/472.01 |
| 6,688,523 B1 | 2/2004 | Koenck ................. 235/462.06 |
| 6,766,955 B2 | 7/2004 | Patel et al. ............ 235/462.45 |
| 7,050,715 B1 * | 5/2006 | Carrington et al. ......... 396/182 |
| 7,222,794 B2 * | 5/2007 | Kumagai et al. ...... 235/462.43 |
| 2004/0149829 A1 * | 8/2004 | Boucher et al. ....... 235/462.43 |
| 2005/0023358 A1 * | 2/2005 | Byun et al. ............ 235/462.45 |

* cited by examiner

HAND HELD SCANNER WITH ROTATING HEAD

This application claims priority of U.S. Provisional Patent Application Ser. No. 60/542,613, filed Feb. 7, 2004.

TECHNICAL FIELD

The invention relates to optical character readers and in particular to hand held optical character readers.

BACKGROUND OF THE INVENTION

Optical character readers (OCRs), as opposed to bar code scanners, capture an image of a surface using a device such as a charged coupled array which converts the image to an electronic signal which is subsequently resolved or decoded with sophisticated software or firmware to identify characters in the captured image. Optical character readers have many applications in automated data collection systems where it is desired to rapidly and efficiently collect data in the form of characters printed on the surface of an article. One such application is collection information from mail pieces, specifically letters, flats and packages, millions of which are processed daily by postal services.

Modern, automated postal scanning systems generally consist of large, fixed pieces of capital equipment. These systems typically require that the letters and flats be properly oriented before the items are scanned for OCR readable information such as destination indicia, codes, and similar data. Typically, high speed, automated equipment is utilized to singular a batch of letters and flats into a stream, orientate the individual mail pieces for scanning and convey the mail pieces past a stationary OCR. Automated parcel scanning, on the other hand, is typically accomplished using cameras positioned to capture images of multiple sides of parcels transported past the cameras.

These automated systems may not be applicable to locations where relatively small numbers of parcels are processed. Likewise, parcels that are over weight, oversized, irregularly shaped or otherwise incompatible with automated scanning equipment, may require manual processing. In these cases, handheld optical character readers may be utilized by operators to acquire information appearing as characters on the surface of the parcel or package.

The nature of the equipment used in optical character reading, and in particular the camera and lens used to image the characters, requires that the read distance, i.e., the distance between the imaging head and the characters be consistent for accurate and successful data collection. An additional factor is the angle of incidence, the angle at which the imaging camera is positioned relative to the characters. Ideally the camera or imaging head is held perpendicular to the surface on which the characters appear to avoid angular distortion of the characters and similar problems. In the case of stationary OCR units utilized in automated systems, this does not typically present a problem insofar as articles are properly oriented prior to scanning and passed in front of an imaging head with the surface to be scanned perpendicular to, and at a controlled distance from the imaging head.

In the case of hand held units, the distance and angle requirements imposed by optical character reading equipment may be problematic. For example, when a hand-held OCR is used to read information from the surface of irregularly sized mail pieces including packages, envelopes and similar items, manual operation of a hand held OCR can require awkward, repetitive motions by the operator of the unit to successfully capture images of the area of interest, normally an address, appearing on the surface of the mail pieces. Under these conditions the speed at which information is collected as well as the accuracy of the data collected may suffer. Thus, while a hand held unit may be convenient for scanning information from articles having a wide variety of sizes and shapes, the desired level of successful character imaging is dependent upon accurate positioning of the unit by the operator.

SUMMARY OF THE INVENTION

A hand-held optical character scanner according to the invention includes a handle with a flat bottom surface for supporting the housing on a substantially flat object and an arm extending from the handle from a location offset from the flat bottom surface. An imaging head including a lens having a focus range is mounted on the distal end of the arm and faces in the direction of the handle. The arm, handle and imaging head are geometrically configured so that the vertical distance between the lens and the flat bottom surface of the handle is within the focus range of the imaging head when the scanner is placed in an upright position on the flat bottom surface of the handle. Preferably, the arm of the hand-held optical character scanner extends from a top end portion of the handle opposite the bottom surface and the imaging head is exposed on an undersurface of an end portion of the arm remote from the handle. In one configuration, the arm extends from the top end portion of the handle at a right angle to the handle, and the imaging head faces downwardly when the scanner is placed in an upright position on the flat bottom surface.

In one variation, the base includes a plurality of flat bottom surfaces for supporting the housing on a substantially flat object at different angles relative to the surface of the object. The flat bottom surfaces are adjacent to one another and define obtuse angles relative to one another, such that the scanner can be rocked in order to move it from resting on one flat bottom surface to the next adjacent flat bottom surface. In this variation, the imaging head is rotatable between angular orientations, the imaging head being lockable in position at selected angular orientations.

In one aspect, the optical character hand-held scanner includes a display screen for displaying information to an operator of the scanner and/or an audible signal generator for generating audible signals to alert the operator of a predetermined event or condition, such as a failure to obtain a resolvable image.

In accordance with a further aspect of the invention, a method of optical character scanning utilizing a hand-held scanner includes the steps of (a) grasping the handle of an optical character scanner between the base of the reader and an arm extending from the base, (b) placing the base of the scanner on an article having optically readable characters on the surface of the article, and (c) capturing an image of the surface of the article with an imaging head mounted on the arm, the imaging head being exposed beneath the arm and directed toward and substantially perpendicular to the base of the reader. The image is captured when the operator depresses a trigger mounted adjacent the handle, actuating the optical character reader.

DETAILED DESCRIPTION OF THE INVENTION

Figure 1:
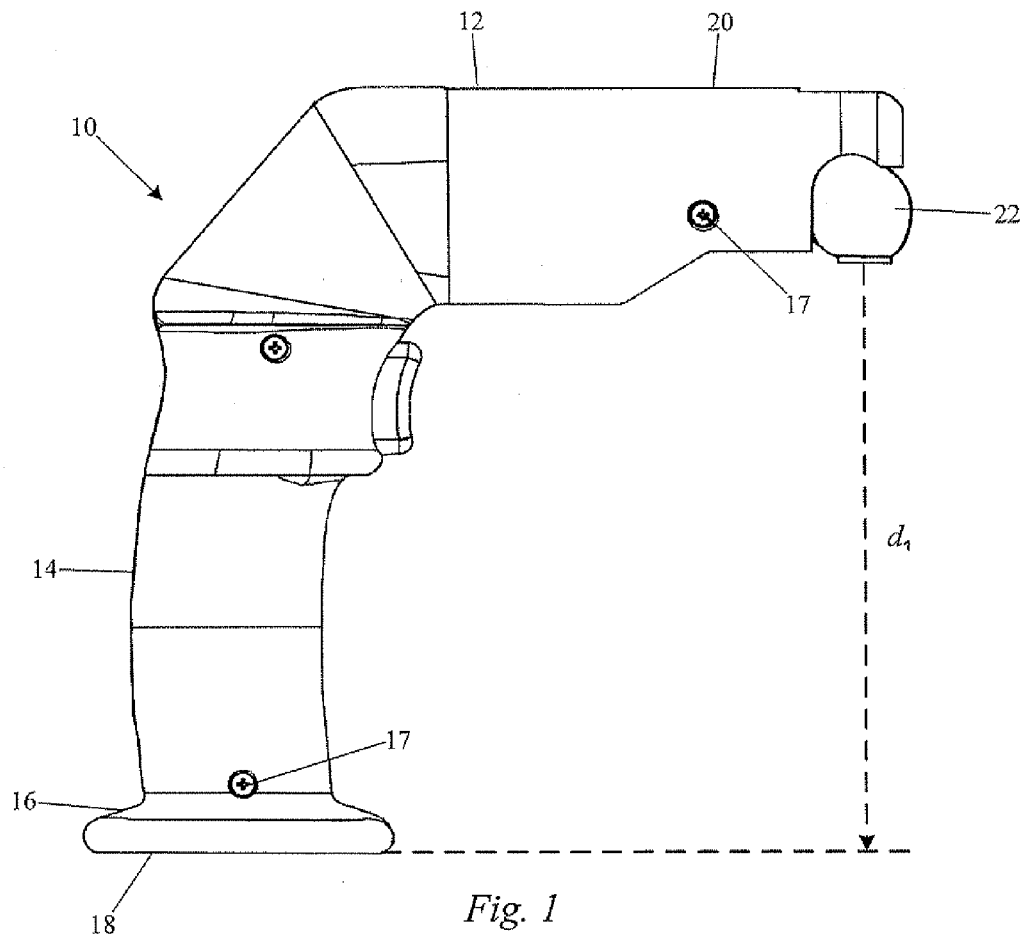
FIG. 1 is a side view of a hand held optical character reader in accordance with the invention.
Figure 2:
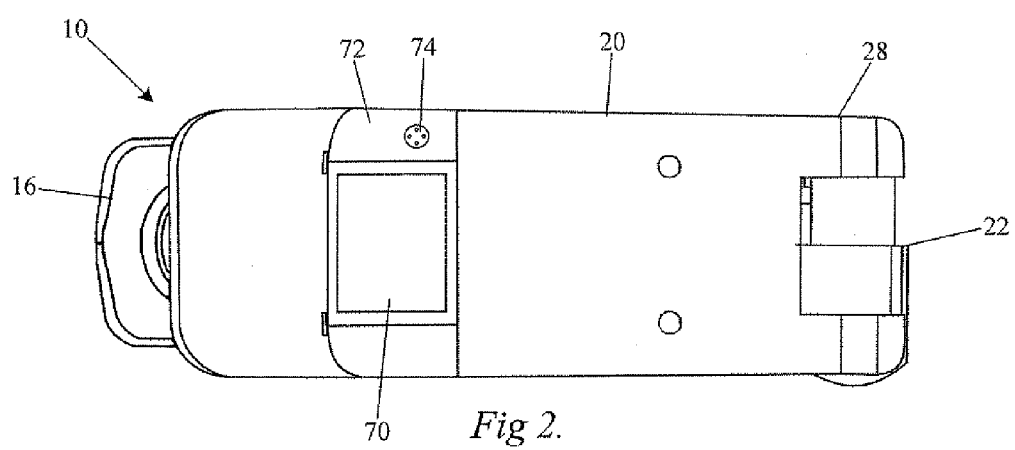
FIG. 2 is a top view of the hand held optical character reader of FIG. 1.

Referring to FIGS. 1 and 2, a hand-held optical character scanner or reader 10 according to the invention includes a housing 12 with a handle 14 having a base 16 with a flat bottom surface 18 for supporting the housing on a substantially flat object such as a box, package or mail piece. As illustrated, an arm 20 extends from the top end of handle 14, opposite flat bottom surface 18, to support an imaging head 22 on the distal end of arm 20. In the illustrated embodiment, housing 12 comprises two housing halves 15 (FIGS. 4 and 5) joined with screws or similar fasteners 17. Housing 12 may be produced by injection molding of housing halves 15 from a suitable plastic. Although as illustrated, arm 20 extends from the top end of handle 14, other configurations of handle 14 and arm 20 may be employed. For example, arm 20 may extend from a position midway up handle 14.

Figure 3:
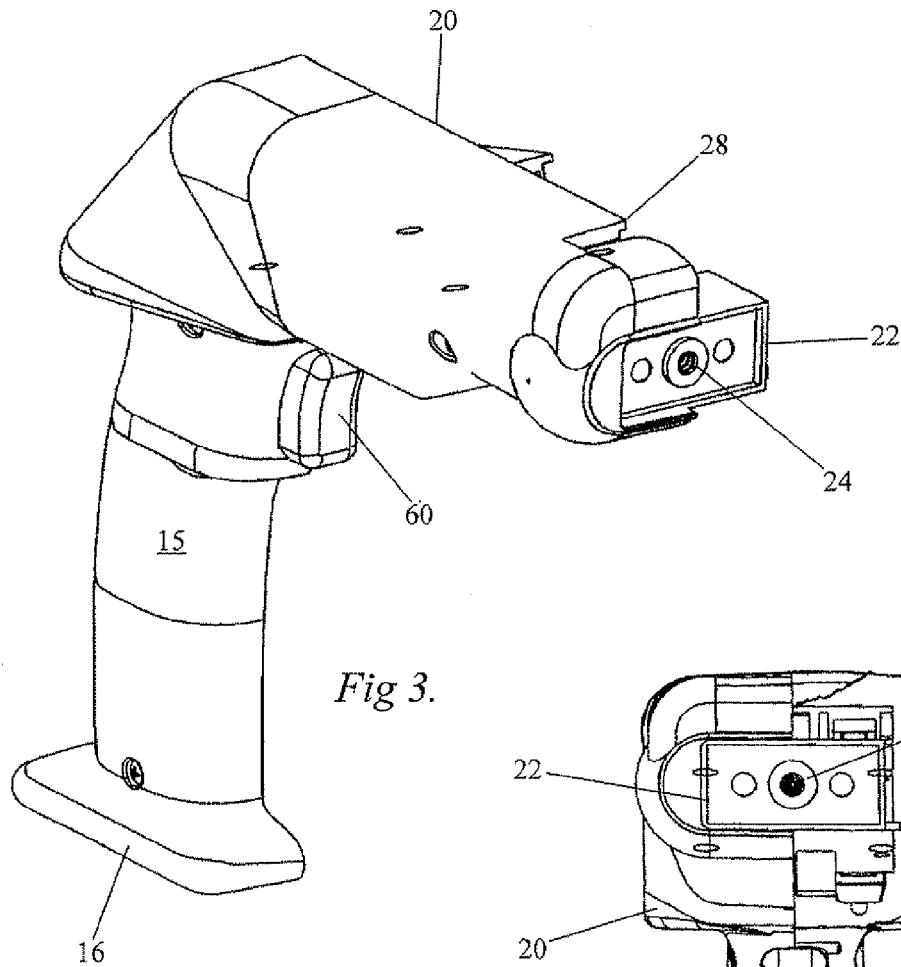
FIG. 3 is a perspective view of the hand held optical character reader of FIG. 1 with one half of the housing omitted.
Figure 4:
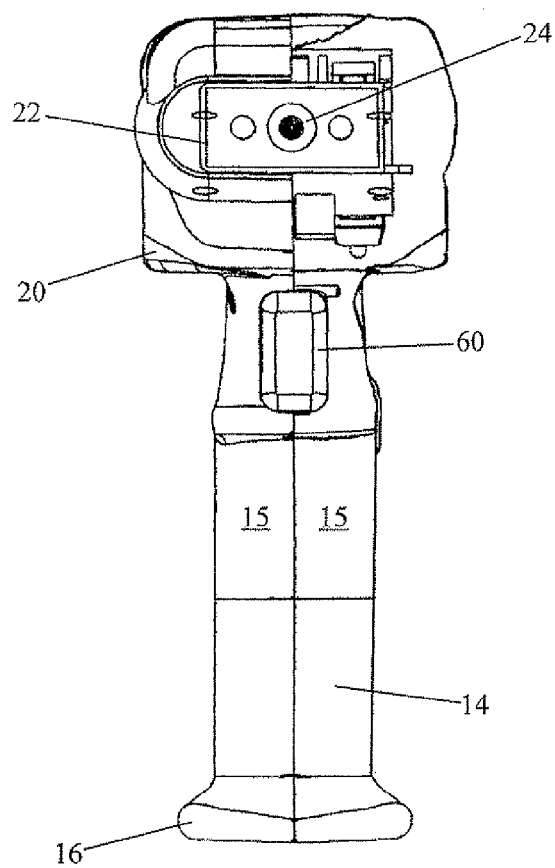
FIG. 4 is a partially cut-away front view of the hand held optical character reader of FIG. 1.

Turning to FIGS. 3 and 4, in order to capture images for optical character processing, a rotatable camera or imaging head 22 with lens 24 is mounted on the distal end 28 of arm 20. In the illustrated embodiments, rotatable imaging head 22 is configured to rotate approximately 90°, between a position, wherein imaging head 22 is aimed downwardly, approximately parallel to handle 14, and the position shown in FIG. 3, where imaging head 22 is aimed parallel to arm 20. Thus, when hand-held character reader is positioned with base 16 on a surface, rotatable imaging head 22 is oriented to point directly downward, as shown in FIGS. 1 and 2, to read characters appearing on the surface adjacent base 16.

As will be appreciated, lens 24 has a fixed focus range within which optical characters may be resolved and imaged by head 22. When head 22 is rotated such that lens 24 is aimed directly downward, in the direction of handle 14, the vertical distance between lens 24 and flat bottom surface 18 of base 16 is equal to $d_1$. In a preferred embodiment, the vertical distance $d_1$ between flat bottom surface 18 of base 16 and lens 24 when the lens is rotated to face downward is within the focus range of lens 24. More preferably, $d_1$ is approximately equal to the midpoint of the focus range of lens 24. For example, if the focal length of lens 24 is from 3 to 9 inches, $d_1$ is preferably about 6 inches.

Figure 5:
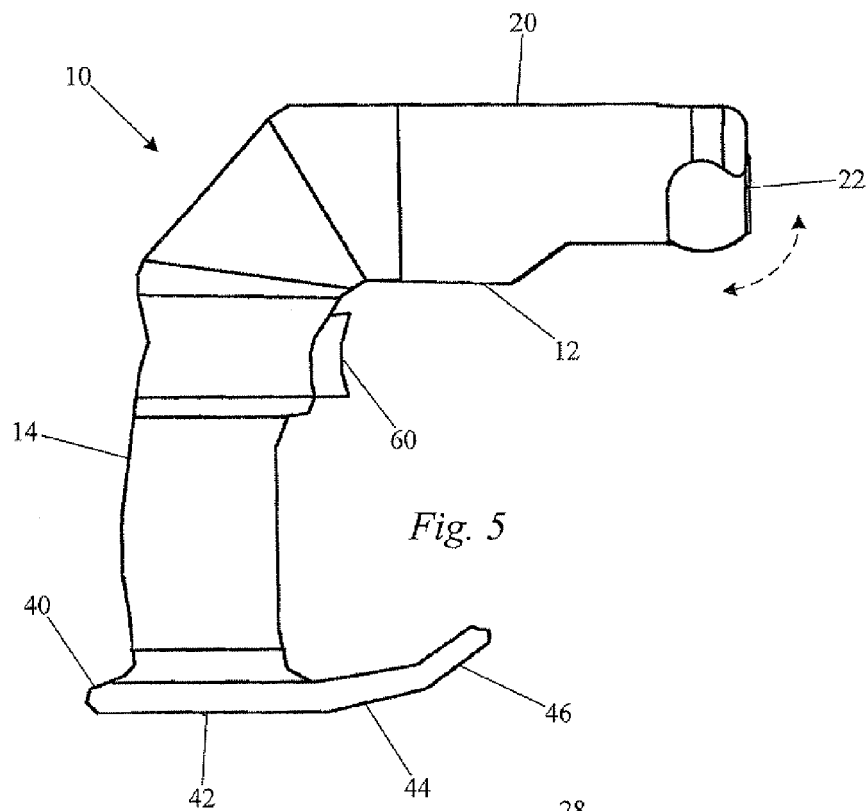
FIG. 5 is a side view of a second optical character reader in accordance with the invention.

Turning to FIG. 5, in another variation, hand held optical character reader 10 is provided with a base 40 having a plurality of flat bottom surfaces 42, 44, 46 adjacent to one another. Base 40 may be formed integrally with handle 14, or may be a separate piece, adapted to slide over base 16. Each of the flat bottom surfaces defines an obtuse angle or angles relative to the adjacent surface 42-46 whereby handheld optical character reader 10 can be rested on any of the surfaces 42-46 to read optical characters on a surface below or adjacent to the base. Base 40 may be formed integrally with handle 14, or may be a separate piece, adapted to slide over base 16. Base 40 enables the user to position handheld optical character reader 10 in the most convenient manner to read characters from the surface of articles. For example, if the user is scanning information from a series of articles passing the user on a conveyor, it may be more efficient in terms of ergonomics to utilize surface 44 or 46 to place optical character reader 10 on the surface of the articles depending upon the user's height, distance from the conveyor and other factors.

Figure 6:
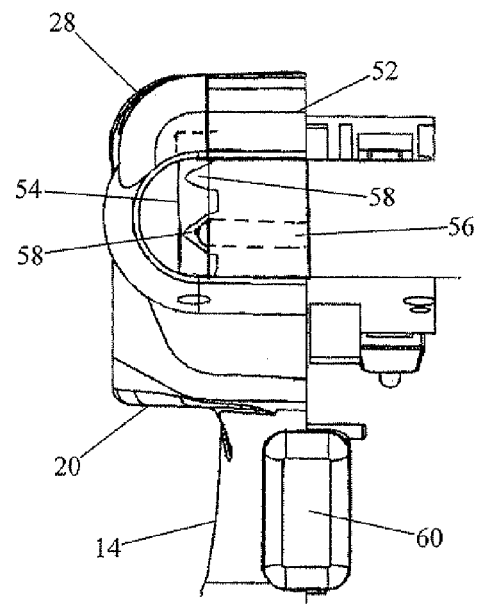
FIG. 6 is a partial cut-away view of a front section of the optical character reader of FIG. 1.
Figure 7:
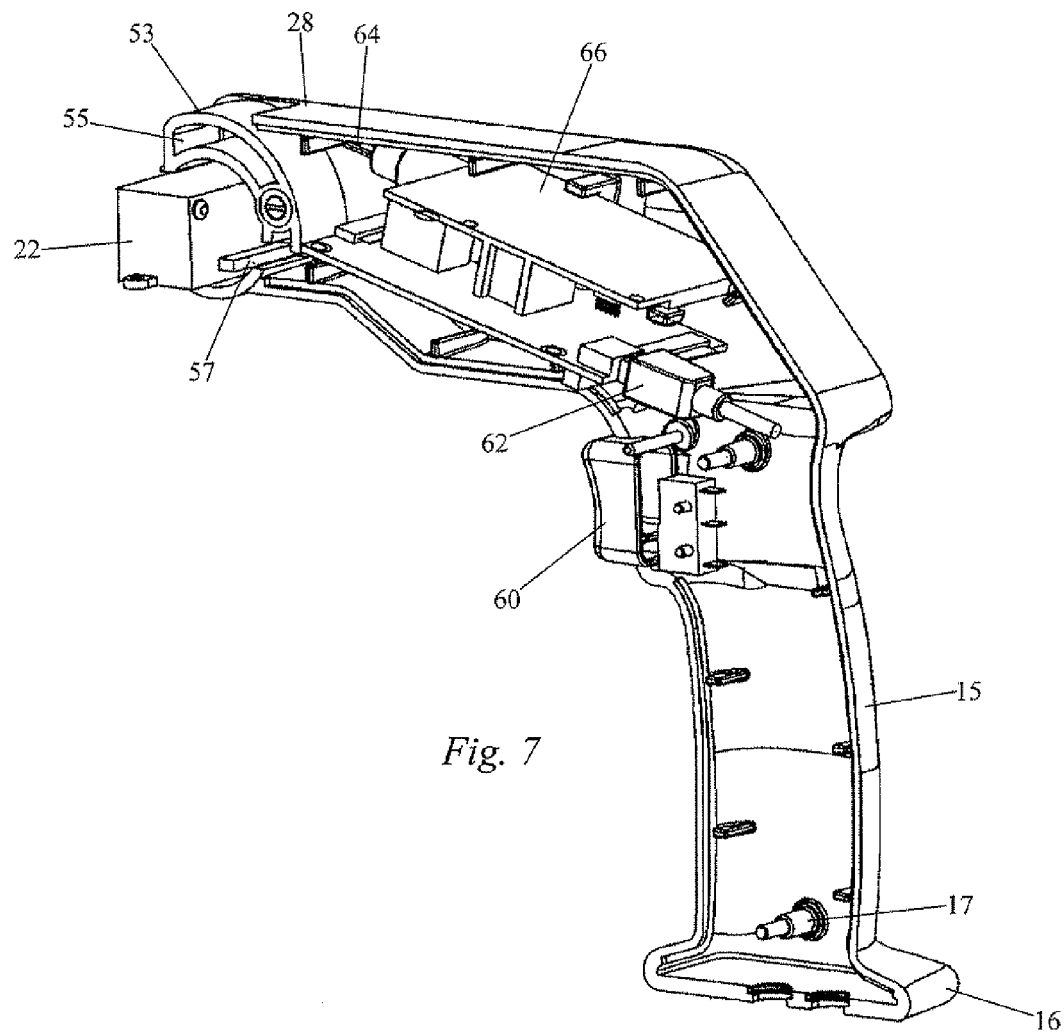
FIG. 7 is a side perspective view of the hand held optical character reader of FIG. 1 with one half of the housing omitted.

Referring now to FIGS. 6 and 7, imaging head 22 is mounted in a two piece rotatable holder 52 (one piece illustrated) at the distal end 28 of arm 20. Each half of holder 52 includes a slot 55 configured to receive a rib 54 (FIG. 6) formed in the corresponding half 15 of housing 12. The rib-slot configuration permits holder 52 to rotate on ribs 54 relative to arm 20 such that imaging head 22 can be aimed at different angles relative to arm 20. A stop 57 is provided to limit rotation of holder 52 within an arc of approximately 90°.

As best illustrated in FIG. 6, each half of holder 52 is also provided with a spring-loaded pin detent 56 that snaps into notches 58 (FIG. 6) in ribs 54 to lock holder 52 in one of a plurality of predetermined angular orientations defined by the notches. As will be appreciated, in order to rotate imaging head 22 from a locked position, sufficient force must be applied to push detent 56 out of notch 58, releasing the imaging head from the locked position.

Each of the angular orientations defined by notches 58 corresponds one of angled surfaces 42, 44, 46 such that when character reader 10 is supported on a selected one of planar surfaces 42, 44, 46, imaging head 22 can be rotated to a corresponding predetermined angular orientation where imaging head 22 is aimed perpendicular to the selected surface. Detent 56 engages the notch 58 corresponding to the selected angular orientation, locking imaging head 22 at the selected angular orientation. In this position, imaging head 22 is aimed at and substantially perpendicular to the surface of flat article upon which character reader 10 is supported on the selected one of surfaces 42, 44 or 46. Thus, the operator may use one of surfaces 42, 44 or 46 to support optical character reader 10 upon articles to be scanned and rotate imaging head 22 to an angular orientation where the imaging head is locked in a position perpendicular to the surface of the article, facilitating the capture of image(s) from the surface of the article.

Once positioned, an operator captures an image with optical character reader 10 by depressing trigger 60. Trigger 60 is connected to switch 62 which in turn actuates character reader 10 to capture image(s) with imaging head 22 which converts the image to an electronic signal. The signals from imaging head 22 are transmitted via lead 64 to circuit board 66 where the signals are processed. A second lead, (not shown) extends from the circuit board through handle 14 to an external microprocessor which receives and processes the information in accordance with preprogrammed instructions.

In one variation, best illustrated in FIG. 2, hand held OCR 10 includes a liquid crystal display or similar screen 70 for displaying information to the operator. Preferably, screen 70 is positioned on angled surface 72 above handle 14 for convenience, however the display could be positioned elsewhere on housing 12, depending upon the specific design. Display 70 is used to inform the operator whether the quality of a captured image is sufficient to allow resolution of characters captured in the image. Other data displayed on screen 70 may include the time, the number of images captured over a given time period and similar information. An audible signaling device 74 may also be incorporated into hand held optical character reader 10 to signal the operator image has been successfully captured.

While this invention has been described with reference to illustrative embodiments, this description is not intended to be construed in a limiting sense. For example, arm 20 could be positioned to extend from handle 14 at another location offset from base 16, so long as imaging head 22 is positioned such that the vertical distance between lens 24 and the bottom surface of the handle is within the focus range of the imaging head. Other such modifications and combinations of the illustrative embodiments, as well as other embodiments of the invention, will be apparent to persons skilled in the art upon reference to the description. It is, therefore intended that the appended claims encompass any such modifications or embodiments.

The invention claimed is:

1. A hand-held optical character scanner, comprising:
   a housing including a handle having a flat bottom surface supporting the housing on a substantially flat object and an arm extending from the handle from a location offset from the flat bottom surface; and
   an imaging head mounted on the arm facing in the direction of the handle, which imaging head includes a lens having a focus range, wherein the vertical distance between the lens and the flat bottom surface of the handle when the scanner is placed in an upright position on the flat bottom surface is within the focus range of the imaging head.

2. The hand-held optical character scanner of claim 1, wherein the arm extends from a top end portion of the handle opposite the bottom surface, and the lens of the imaging head is exposed on an undersurface of an end portion of the arm remote from the handle.

3. The hand-held optical character scanner of claim 2, wherein the arm extends from the top end portion of the handle at a right angle to the handle, and the imaging head faces downwardly when the scanner is placed in an upright position on the flat bottom surface.

4. The hand-held optical character scanner of claim 1, wherein the handle has a plurality of flat bottom surfaces for supporting the housing on a substantially flat object at different angles relative to the surface of the object.

5. The hand-held optical character scanner of claim 4, wherein the plurality of flat bottom surfaces are adjacent to one another and define obtuse angles relative to one another, whereby the scanner can be rocked in order to move it from resting on one flat bottom surface to the next adjacent flat bottom surface.

6. The hand-held optical character scanner of claim 5 wherein the imaging head is mounted on a distal end of the arm and wherein the imaging head is rotatable relative to the arm.

7. The hand-held optical character scanner of claim 6 wherein the imaging head is rotatable between angular orientations, the imaging head being lockable in position at selected angular orientations.

8. The hand-held optical character scanner of claim 7 wherein a selected angular orientation corresponds to one of the plurality of flat bottom surfaces so that the imaging head is lockable in a position where the imaging head is aimed perpendicular to the selected flat bottom surface.

9. The hand-held optical character scanner of claim 1 further comprising a display for displaying information to an operator of the hand-held scanner.

10. A hand-held optical character scanner comprising:
    a handle including a base, the base including a plurality of angled planes for supporting the handle on a substantially flat object at different angles relative to a surface of the object;
    an arm extending from the handle; and
    a moveable imaging head having a fixed axis lens and a focus range mounted on the arm, the imaging head being rotatable to selected positions corresponding to the angled planes whereby the distance between the surface of the object and the imaging head along the lens axis is within the focus range of the lens when the handle is supported on each of the angled planes.

11. The hand-held optical character scanner of claim 10 wherein the imaging head is lockable at the selected positions.

12. The hand-held optical character scanner of claim 11 wherein the imaging head is aimed perpendicular to one of the selected planes when locked in a selected position.

13. The optical character scanner of claim 10 wherein the arm extends substantially perpendicular to the handle and the imaging head is mounted on a distal end of the arm.

14. The optical character scanner of claim 10 wherein the imaging head is rotatable over a range of about 90 degree.

15. The optical character reader of claim 10 wherein the imaging head is rotatable from a position whereat the imaging head is aimed parallel to the handle to a position whereat the head is aimed parallel to the arm.

16. The optical character scanner of claim 10 further comprising a screen for displaying information to an operator of the scanner, the display being positioned adjacent the handle of the scanner.

17. The optical character scanner of claim 10 further comprising an audible signal device for generating an audible signal to alert an operator of the scanner of a selected condition.

* * * * *